Figure 1:
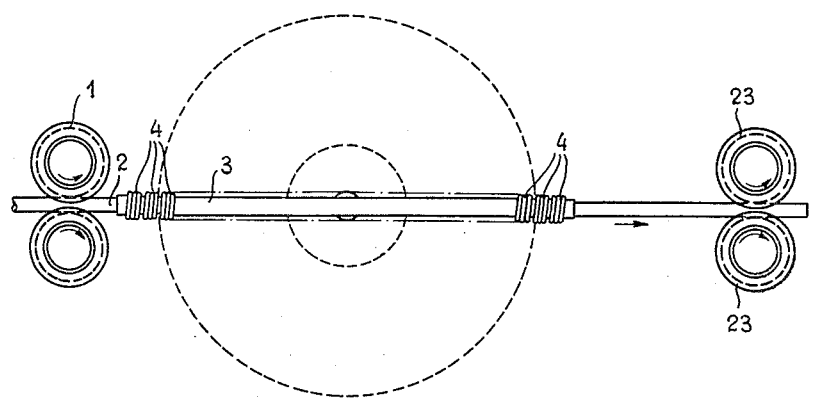

Feb. 4, 1958  G. ZUPPIROLI  2,822,453
HEATING A PORTION OF A PROFILE
Filed Dec. 21, 1956  3 Sheets-Sheet 1

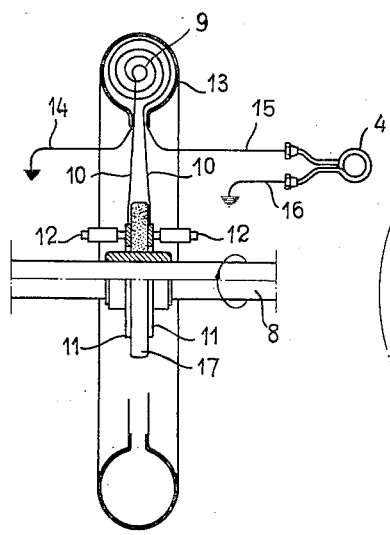
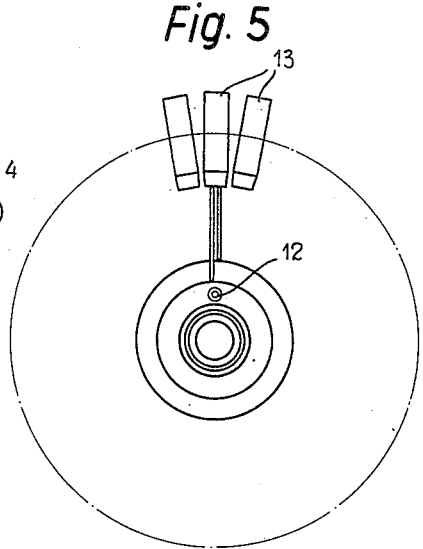
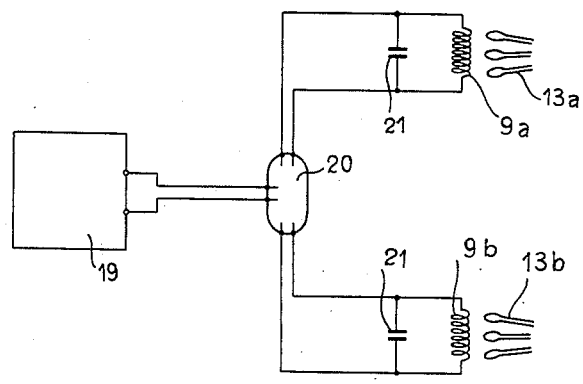

United States Patent Office 2,822,453
Patented Feb. 4, 1958

2,822,453
HEATING A PORTION OF A PROFILE

Guido Zuppiroli, Milan, Italy, assignor to Innocenti Soc. Generale per l'Industria Metallurgica E. Meccanica, Milan, Italy Application December 21, 1956, Serial No. 629,895

Claims priority, application Italy December 22, 1955

2 Claims. (Cl. 219—7.5)

This invention relates to a process and device for heating a longitudinally confined portion of a profile performing a substantially uniform motion.

In this description and appended claims the term "profile" is used to refer to any body of any constant cross sectional shape, the longitudinal dimension of which exceeds its transverse dimensions.

The invention is more particularly useful in cutting profiles in the form of metal tubes to portions of desired lengths as they issue from the rough and finishing rolling mill or, anyhow, during or after the process of manufacture of the tube in the case of weldless tubes or after welding in the case of tubes made of sheet metal or metal band.

The problem of cutting tubes as they issue from the rolling mill raises several difficulties.

As is well known metal tubes are delivered by the rolling mill at a relatively high rate, for instance up to 5–6 metres per second.

In order to cut the tubes by conventional methods the cutting device should move at the same speed as the tube during cutting, thereupon quickly return in a direction against feed of the tube for the next cutting operation.

Considering the high speeds involved it will be obvious that the mechanical solution of the problem leads to elaborate expensive apparatus.

This invention eliminates the above drawback by providing a process and device for heating a longitudinally confined region of a profile performing a substantially uniform motion, more particularly for cutting a profile as it issues from the manufacturing device.

A further purpose of this invention is to provide a device of the type referred to which is automatically adjustable on variation of the profile manufacturing rate.

A further object of this invention is to provide a device of the type referred to adapted to process profiles moving at any desired high speed.

The process for heating a longitudinally confined region of a profile performing a substantially uniform motion according to this invention comprises the steps of providing a plurality of electric inductors, each of which is adapted to heat a longitudinally confined region of the profile, so arranged as to act on the profile on movement of the latter, and energizing the said inductors successively and in synchronism with the displacement of the profile to cause them to constantly operate on the same longtiudinally confined region of the profile for the purpose of heating it.

When the process is used for cutting a profile to sections, it moreover comprises the additional step of exerting a traction in a longitudinal direction on the profile after localised heating, for separating the two portions of the profile on both sides of the heated region.

The invention further provides a device for carrying out the method, comprising a plurality of electric inductors each so arranged as to act on a zone of limited length of the profile on movement of the latter for heating the said zone, means for feeding the profile at a substantially uniform rate and means for successively energizing the inductors in synchronism with the profile feed means, to cause the said inductors to constantly act on the same region of the profile for heating it.

Figure 2:
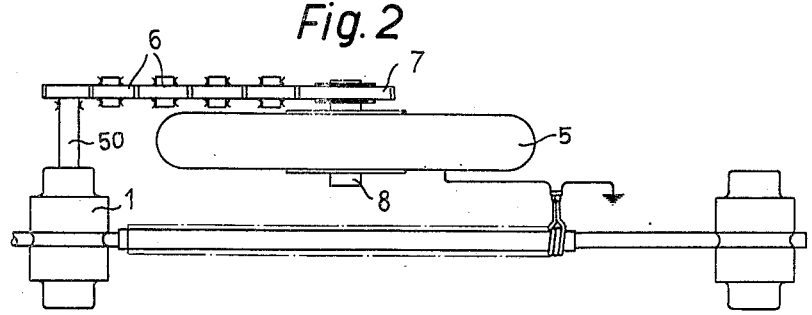
Figure 3:
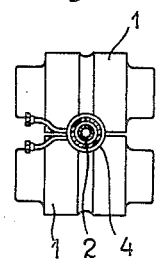
Figure 7:
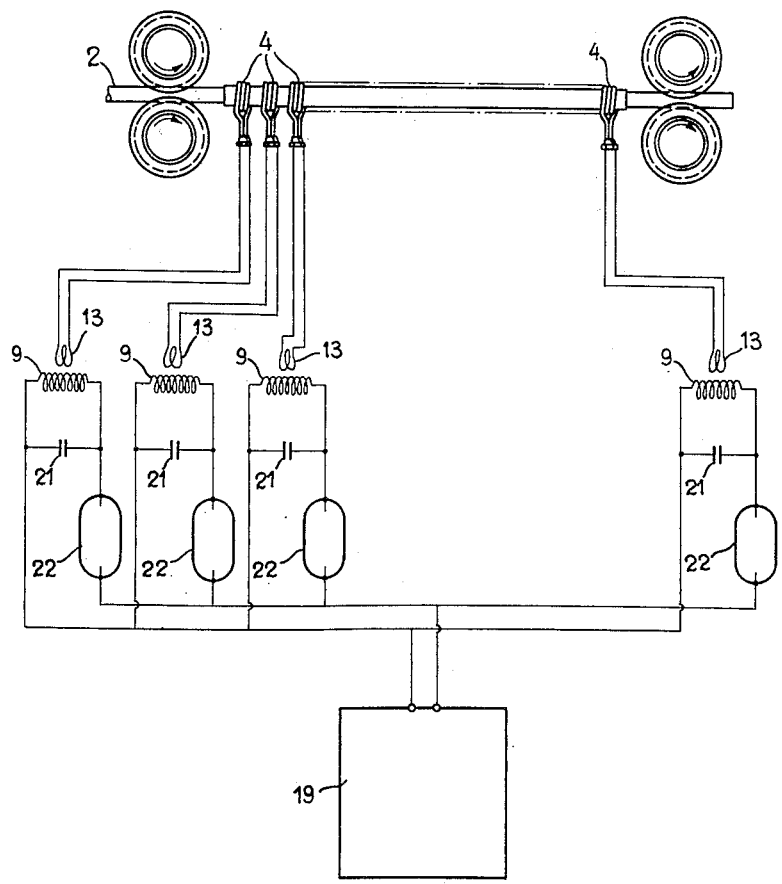

The invention shall be described with reference to the accompanying drawings, given by way of example only, wherein:

Figure 1 is a lateral elevational view showing diagrammatically the device for carrying out the method according to this invention;
Figure 2 is a plan view of Figure 1;
Figure 3 is an end view of Figure 1;
Figure 4 is a diagrammatical axial sectional view of an embodiment of the inductor feeding device;
Figure 5 is a front view of Figure 4;
Figure 6 shows the electric circuit of a modification;
Figure 7 is a wiring diagram of a further embodiment of the inductor supply device.

In the specification and appended claims the term "inductor" is used to designate any electrical device of known type adapted to act on a material for heating it without contacting said material.

The inductor can therefore comprise a coil energised by an alternating current for heating ferromagnetic material or, simply, metallic material. When ferromagnetic materials are processed heating is effected, as is well known, through magnetic hysteresis and induced current. With non-ferromagnetic materials heating is effected merely by induced current.

For heating non-metallic materials the inductor may comprise the two armatures of a capacitor between which the profile is passed; in this case, heating is effected by displacement or dielectric currents within the material acting as the dielectric for the capacitor.

The invention shall be described with reference to heating and cutting iron tubes, though it will be obvious from the above that it can be used also in connection with heating and cutting non-ferromagnetic metals and other materials of any shape.

On the drawing, 1 denotes the cylinders of a rolling mill manufacturing an iron tube 2.

On issue from the rolling mill the tube is fed through a tube of refractory material 3 surrounded by a plurality of inductors 4 formed by coils energised by alternating current.

The tube issuing from the inductors 4 travels through a further pair of cylinders 23 without contacting the latter, the cylinders 23 having a surface speed higher than the linear rate of feed of the tube. As the heated tube region leaves the last inductor, the cylinders 23 are sharply brought into contact with the tube and accelerate the latter drawing its heated region and subsequently severing the tube portions on both sides of the said region.

The inductors can be successively energized, for instance, by means of an electrical machine 5 driven synchronously with the tube feed means comprising the rolling mill cylinders 1 themselves, to supply current to the inductors for causing them to act successively constantly on the same tube region for heating the profile travelling therethrough.

The electrical machine is driven by the shaft 50 of one of the rolling mill cylinders 1 through a set of toothed gears 6, the last toothed gear meshing with a toothed wheel 7 keyed on the shaft 8 of the electrical machine.

The electrical machine is described in a copending application and is diagrammatically shown in Figures 4 and 5.

The machine comprises a primary winding 9, the ends of which are connected to insulated rings 11. An electric generator of a suitable power and frequency feeds brushes 12 cooperating with the rings 11.

The primary winding 9 moves within a plurality of secondary windings 13, each of which has one ground grounded at 14, the other end 15 being connected with one of the coils 4, the other end of each coil being grounded at 16.

17 denotes a ring of insulating material fast with the shaft 8 of the electrical machine and having secured thereto the leads 10 supplying and supporting the primary winding 9 and rings 11.

When a higher number of coils 4, hence secondary windings 13 is provided, it may be convenient to adopt two or a plurality of electric machines instead of one only, in order to avoid excessive dimensions of the single machine. This modification is shown in Figure 6, wherein 9a and 9b denote the two energizing windings for two electrical machines, 13a and 13b denoting their secondary windings.

The primary windings 9a and 9b are energized through an alternating current generator 19, which is switched over to either electrical machine through a thyratron 20.

Of course, any other suitable switching device of a known type could be used, the wiring diagram of Figure 6 not being intended as a limitation. More particularly, switching can, alternatively, be effected ahead the oscillator triodes of the generator or past the capacitor.

When the frequency of the current energizing the inductors 4 is very high, a capacitor 21 is connected in parallel with each of the primary windings 9a, 9b; the condensers 21 and windings 9a, 9b serving as actual oscillatory circuits.

Drawing of the heated tube region, effected by the pair of cylinders 23 according to the Figure 1, could be effected by any other known means.

The successive energization of the inductors can, according to a further embodiment of the invention, be obtained by a switch as shown in Figure 7, wherein 4 denotes the inductors, 21 the capacitors forming together with primary inductances as many oscillatory circuits as there are inductors. Tube switches of Thyratron type are controlled synchronosuly with the tube feed rate, whereby current flow is effected successively to the inductors 4. Similarly to the diagram shown in Figure 6 switching could, alternatively, be effected ahead of the oscillatory triodes or past the capacitor.

In the case of low powers or reduced rate of feed of the tube the inductors can at will be energized by means of an alternating current generator successively switched over to the various inductors by means of mechanical or relay switches. When the inductors 4 are fed by a high-frequency generator, considering that the generator delivers power intermittently in accordance with the profile cutting periods, the generator can be caused to deliver an instantaneous power much higher than the generator could deliver in a continuous manner.

More particularly, a capacitor can be employed which is charged by the direct current feed unit and is discharged by pulses on the anode circuit (oscillatory triodes).

It is then possible to reduce the nominal power of the high-frequency generator with inherent advantages in cost and operation.

Of course, the number of inductors or coils 4 depends upon the size of the profile to be cut, more particularly the diameter and gauge of the iron tube.

It is understood that, while the principle of the invention is left unaltered, constructional details and embodiments can be largely varied with respect to the examples described and shown on the drawings, without departing from the scope of this invention.

What I claim is:

1. Method of heating a longitudinally confined region of a profile performing a substantially uniform motion, which comprises the steps of providing a plurality of electrical inductors which are each adapted to heat a longitudinally confined region of the profile and so arranged as to successively act on the profile during movement of the latter, and energizing the said inductors successively and synchronously with the movement of the profile to cause them to constantly act on a same longitudinally confined region of the movable profile for heating it.

2. Device for carrying out the method as claimed in claim 1, wherein the device comprises a plurality of electrical inductors, each arranged in such position as to successively act on a confined portion of the profile during movement of the latter for heating it, means for feeding the profile at a substantially uniform rate and means for successively energizing the inductors synchronously with the profile feed means, whereby the said inductors are caused to successively act constantly at the same profile region for heating the latter.

References Cited in the file of this patent

UNITED STATES PATENTS

| | | |
|---|---|---|
| 2,480,315 | Bennett | Aug. 30, 1949 |
| 2,507,817 | Ropp et al. | May 16, 1950 |

FOREIGN PATENTS

| | | |
|---|---|---|
| 721,900 | Germany | June 22, 1942 |
| 1,098,825 | France | Mar. 9, 1955 |